March 26, 1957     R. W. KUENNING     2,786,967
THYRATRON CONTROL CIRCUIT
Filed July 17, 1953
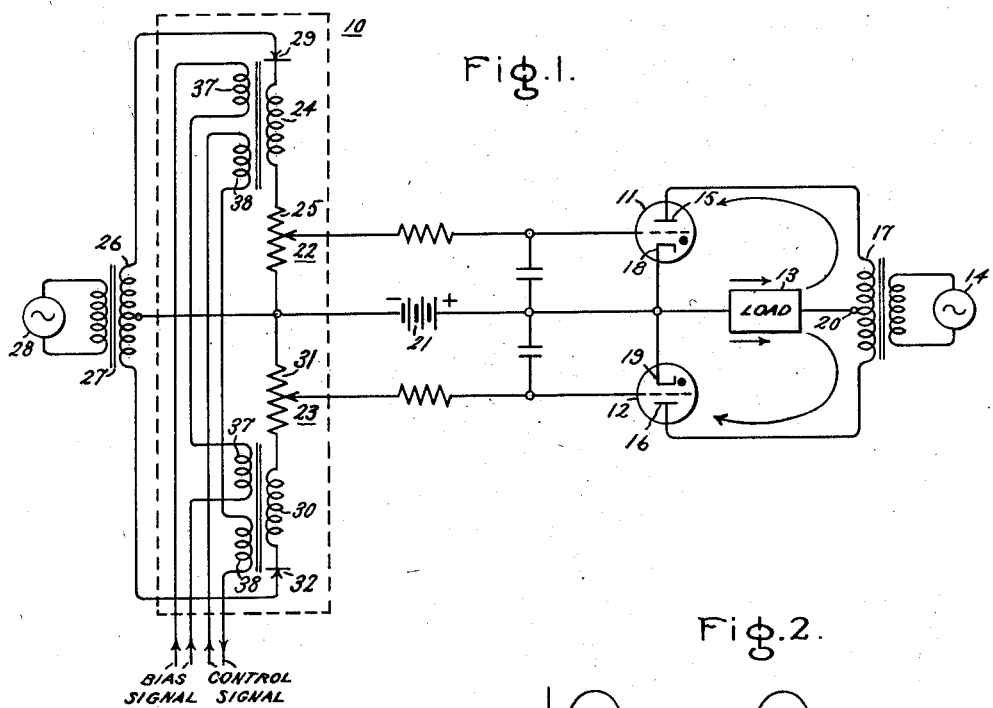
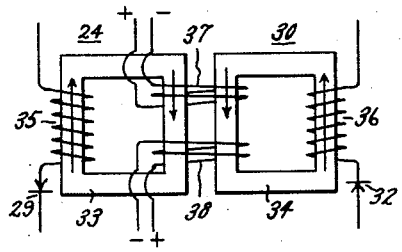
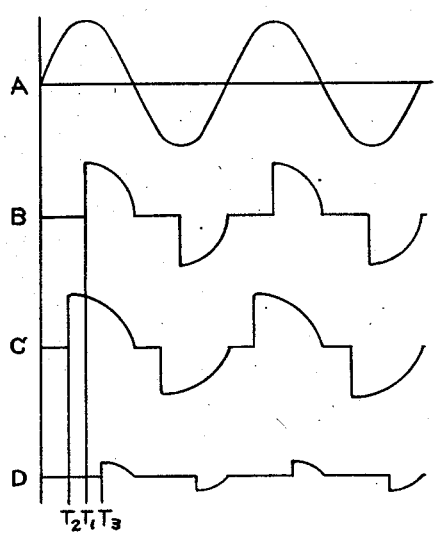
Inventor:
Robert W. Kuenning,
by Richard E. Hooley
His Attorney United States Patent Office 2,786,967
Patented Mar. 26, 1957

2,786,967

THYRATRON CONTROL CIRCUIT

Robert W. Kuenning, Livermore, Calif., assignor to General Electric Company, a corporation of New York Application July 17, 1953, Serial No. 368,709

12 Claims. (Cl. 315—163)

This invention generally relates to excitation devices for electron tubes, and more particularly to electrical circuits for precisely controlling the conduction time of gas filled electron tubes.

Current conduction through gas filled electron tubes, like high vacuum electron tubes, may be initially controlled by a suitably energized control grid. However, unlike vacuum tubes, once current flow is established through a gas filled tube the control grid may not normally extinguish the tube. Accordingly, in circuits employing gas filled tubes wherein both an "on" and "off" control of the tube is desired, the control grid is generally energized at the proper time to initially establish conduction through the tube or "fire" the tube, and thereafter alternative means associated with the tube plate-cathode circuit are employed to extinguish this conducting condition.

One common alternative manner heretofore employed for controlling the extinguishment of gas filled electron tubes has been to energize the tube plate-cathode circuit with an alternating current power source. Then, inasmuch as the tube may only pass unidirectional current from plate to cathode, or on alternative positive half cycles of the alternating current, the tube is automatically extinguished at the end of each positive half cycle. Having the extinguishment of the tube automatically controlled, the amount of current passed through the tube, or the time the tube is conducting during these alternative positive half cycles of the source has then been controlled by energizing the control grid to fire the tube at preselected instant during each of these positive half cycles. The sooner the tube is fired by the energized grid during each positive half cycle, the longer the tube conducts until the end of that positive half cycle, and the greater the current flow through the tube.

Inasmuch as the control grid voltage required to fire a gas filled tube is approximately zero with respect to the cathode and varies only slightly in accordance with the voltage applied to the tube plate, one previous manner of varying the time of control grid energization during positive half cycles of the plate voltage has been to apply a similar alternating current to the control grid through a time phase shifting device. By thus controlling the phase of the grid voltage with respect to the plate voltage, the grid may be positively energized at any time during each half cycle as determined by the phase shifter and the tube accordingly fired at this instant. Other methods known to the art for controlling the time of firing have been to energize the tube control grid with positive voltage pulses whose time of occurrence with respect to positive half cycles of tube plate voltage may be varied; however, inasmuch as the latter pulses are also varied in time to control the tube conduction they, too, may be classified broadly as phase shifters.

Many types of phase shifters suitable for these purposes are known to the art, including vacuum tube wave shaping and shifting circuits, electrical circuit networks employing standardized resistors, capacitors, and inductors; and self-saturating transformers provided with auxiliary saturating windings. The vacuum tube circuits enable precise phase shifting over wide ranges in response to small control signals. However, for applications wherein these circuits are subjected to vibration and shock, the vacuum tubes, being adversely affected thereby, render these phase shifters unsatisfactory. The electrical circuit networks similarly provide wide range phase shifts, but in their simplest form change of phase effected by mechanical variation in the value of one or more of the circuit elements thereby prohibiting remote control of phase shift except by additionally employing position servos or other relatively complex and costly equipment to effect this remote mechanical variation. Finally, the phase shifters of the type generating pulses which may be varied in time in accordance with a control signal; such as the saturating transformers provided with auxiliary saturating windings wherein the phase of the output pulses is varied by varying the value of a direct current flowing through the auxiliary saturating winding, generally require appreciable power through the saturating winding to effect saturation. Therefore, in applications wherein only small control signals are available for actuating the phase shifter, these latter devices are generally unsatisfactory without additional means for amplifying these small control signals.

In a copending application of Herbert W. Taylor, entitled "Thyratron Control Circuit," Serial No. 368,761, filed July 17, 1953, and assigned to the same assignee as the present invention, a pulse type time phase shifter is disclosed which may precisely control the firing point of a gas filled electron tube over a wide range. However, unlike the saturating transformer pulse phase shifters, known in the prior art and discussed above, this wide range time phase shifter operates in response to relatively small control signals, thereby eliminating the need for additional amplification in applications wherein only low power signals are available.

The present invention is directed toward providing a time phase shifter generally of this latter type and constituting a modification thereof for precisely controlling the firing point of a gas filled electron tube by generating periodic pulses to the tube control grid which are synchronized to occur during positive half cycles of the alternating voltage energizing the tube plate-cathode circuit, but which may be precisely time phase shifted over a wide range during these half cycles in response to a relatively small control signal to thereby accurately control the conduction time of the tube.

In accordance with one embodiment of this invention, this phase shifter is comprised of a simple voltage divider circuit employing a self-saturable type reactor in series with a rectifier, a resistor and an alternating current source to ground. The alternating current source being synchronized with a similar source energizing the gas tube plate-cathode circuit. At a predetermined time during consecutive cycles of the source this reactor self-saturates, thereby changing its impedance from a relatively high value to a low value and enabling most of the alternating current voltage to appear across the resistor in series therewith as an elongate pulse with a steep wave front. Connecting this resistor across the control grid of the gas filled tube thereby enables the tube to be fired at this instant by this pulse. By means of a relatively small control signal energizing an auxiliary saturating winding of the reactor the instant at which the reactor saturates during each half cycle of the alternating current source may be precisely controlled, whereby the conduction time of the gas tube may be similarly controlled.

It is, therefore, one object of this invention to provide an excitation device for controlling the conduction time of gas filled electron tubes which is substantially unaffected by shock and vibration.

A further object is to provide an excitation device for controlling the conduction time of gas filled electron tubes.

A further object is to provide an excitation device for controlling the conduction time of gas filled electron tubes over a wide range with low power control signals.

A further object is to provide a simple and inexpensive excitation device for controlling the conduction time of gas filled electron tubes.

A further object is to provide a phase shifter remotely operable over a wide range with small variations of a control signal.

Other objects and many attendant advantages and features will be more readily comprehended by those versed in this art during the course of the following detailed description, taken in connection with the accompanying drawings forming a part of this specification in which:

Fig. 1 is an electrical schematic diagram illustrating a gas tube excitation circuit in accordance with the present invention, Fig. 1A is a wiring diagram of a self-saturable reactor employed in the circuit of Fig. 1; and Fig. 2 is a wave form diagram for illustrating the operation of this excitation circuit.

Referring now to Fig. 1 for a detailed consideration of one embodiment of the present invention, a potential divider circuit for providing time phase shifted pulses, enclosed within a dotted line generally designated 10, is placed in circuit to energize the control grid-cathode circuit of two gas filled tubes 11 and 12 which control the amount of direct current energy fed to a load 13 by a power source 14.

Gas tubes 11 and 12 are interconnected in a push-pull type arrangement with the load 13 and power source 14; that is, their respective plate elements 15 and 16 being electrically connected across opposite ends of a center tapped power transformer secondary winding 17 are alternately energized during successive half cycles of the alternating current power source 14 with positive polarity voltage with respect to their cathode elements 18 and 19, which in turn are inter-connected and joined with the center tap 20 of transformer secondary 17 through load 13. Gas tubes, as is well known, may only conduct current during positive half cycles of an alternating current source energizing the plate-cathode circuit thereof and are extinguished near the start of the negative going cycles, such that with a push-pull type connection of these tubes, as illustrated, tube 11 may only conduct during a half cycle of one polarity of source 14 and tube 12 during a half cycle of the opposite polarity. The result of this operation is, of course, that one of these tubes is always cut off while the other is conducting, and load 13 may accordingly receive full wave rectification by successive half cycles of the alternating current source 14 being diverted alternately through the tubes in the direction indicated by the arrowed lines shown.

However, as is also well known in the art, the initial conduction through a gas tube may also be controlled by the potential existing between the tube control grid and cathode, and therefore in view of the fixed bias voltage 21, as shown, common to the control grid-cathode circuit of each of tubes 11 and 12 and supplying a negative voltage thereto, current conduction through these tubes is normally cut off, unless positive voltage signals sufficient to overcome the effect of this bias are received from potential divider 10 to energize these control grids.

Potential divider circuit 10 preferably includes two identical potential divider circuits connected back-to-back, as shown, and for convenience these dividers will hereinafter be distinguished by defining one as upper potential divider 22, and the other as lower potential divider 23. Upper potential divider 22 includes a suitable self-saturating reactor 24 in series with a resistor or potentiometer 25 across an alternating current source, which may be the output of one-half of a secondary winding 26 of a transformer 27, whose primary winding is energized by an alternating current source 28 in time phase relation with the gas tube power source 14. In series relation with these upper potential divider elements to enable only a unidirectional current to pass therethrough is a rectifier or diode element 29. Lower potential divider 23 similarly includes a second self-saturable reactor 30 in series with a resistor or potentiometer 31 across a second alternating current source which is 180° out of time phase relation with the first source and which may comprise the second half of the center tapped secondary winding of transformer 27, as shown. In series relation with the elements of lower potential divider to enable only a unidirectional current to pass therethrough is a second rectifier or diode 32, and as may be observed from the placement of these rectifiers and the opposite polarity energization of the upper and lower potential divider circuits, source current passes through the elements of the upper divider only during half cycles of one polarity, and passes through the elements of the lower divider only during half cycles of the opposite polarity.

As illustrated by Fig. 1a, reactors 24 and 30 are preferably comprised of separate closed core members 33 and 34 of saturable magnetic material, such as iron or suitable alloys thereof, arranged to provide two closed magnetic paths. An alternating current coil 35 is wound about the outer leg of core 33, a second alternating current coil 36 is wound about the outer leg of core 34, and two additional coils termed a signal coil 37 and a bias coil 38 are wound to jointly embrace both cores. With this arrangement it may be readily comprehended, by means of the right hand screw rule, that energization of signal coil 37 and/or bias coil 38 with a direct current voltage of the polarity indicated in the drawing assists in the saturation of both cores 33 and 34 provided by the unidirectional current flow through alternating current coils 35 and 36 in the direction indicated by arrowed lines as shown; and energization of these coils in the opposite direction opposes such saturation.

For an understanding of the operation of the overall potential divider circuit in providing pulses synchronized to occur during consecutive half cycles of power source 14 but variable in time during these half cycles to control the conduction time of gas tubes 11 and 12, the detailed operation of upper potential divider 22 will initially be considered. During consecutive positive half cycles of alternating current source 28, current flow is directed through rectifier 29, coil 35 of reactor 24 and potentiometer 25 by the upper half of transformer secondary winding 26. Reactor 24, being self-saturable, saturates at some time during this half cycle when the current passing therethrough reaches a given value; and at the time of such saturation its impedance value abruptly drops from a relatively large value to a relatively small value. When reactor 24 is in unsaturated condition, its impedance value is high with respect to the resistance of potentiometer 25, and therefore most of the alternating current voltage drop from the source appears across the reactor with a negligible voltage appearing across the potentiometer. However, at the time reactor 24 saturates, its impedance, changing to a low value, allows most of this voltage drop to abruptly appear across potentiometer 25 as an elongated pulse having a steep wave front. Thus during each positive half cycle of the alternating current source, the self-saturation of reactor 24 provides a pulse across potentiometer 25; and this pulse is conveyed to the control grid-cathode circuit of gas tube 11 through a coupling circuit including a series resistor and shunt capacitor as shown. Should the plate-cathode circuit of gas tube 11 be energized by a positive voltage at the time this grid signal is received, the tube is "fired" by this pulse and current flows to the load as indicated by the arrowed lines. This current conduction continues for the remainder of that half cycle until the tube is extinguished by the alternating current supply voltage 14, energizing the tube plate-cathode circuit, reverses its polarity and goes negative.

Now, for advancing the time during each positive half cycle when reactor 24 saturates and, therefore, advancing the instant of firing gas tube 11, the signal coil 37 is provided; and energizing this coil with a current of proper polarity to aid the source current saturation of reactor 24, it is readily comprehended that such saturation will be effected at an earlier time during the positive half cycle. Conversely, should total cut off of the gas tube be desired or less current passed therethrough than would normally flow with no signal current, the firing of the gas tube may be delayed by energizing signal coil 37 with reversed polarity current in opposition to the alternating current saturation provided by current flow through coil 35. Thus, in effect, a phase shifter is provided for advancing or delaying the firing point of a gas tube over a wide range by the application of small control signals.

Lower potentiometer circuit 23, being comprised of an identical arrangement of elements, operates in a manner similar to that of upper potential divider 22. However, inasmuch as lower divider 23 is energized by a voltage 180° out of phase with the voltage energizing the upper divider, and in addition, its series rectifier 32 is oppositely connected with respect to upper rectifier 29, the pulses generated thereby are phase displaced 180° from those of upper divider. Thus, this push-pull arrangement of saturable reactors provides phase shifted pulses during both positive and negative half cycles of alternating current source 28, and inasmuch as this source is in time phase relation with source 14 energizing in push-pull the plate-cathode circuits of tubes 11 and 12, these pulses energize the control grids of these tubes coincidentally with the plate-cathode circuits thereof being positively energized.

For a graphic illustration of this operation, reference is now made to Fig. 2 illustrating the voltage waveforms generated by voltage divider 10 and applied to the control grid-cathode circuits of gas tubes 11 and 12 for three conditions of phase shift. Upper curve A illustrating the sinusoidal waveform of the alternating current source 28 or 14 is employed as a time base. Waveforms B, C and D consecutively below A illustrate the voltage occuring across potentiometers 25 and 31 as reactors 24 and 30 are saturated at various times; curve B, being the normal gas tube firing time as reactors 24 and 30 self-saturate at time T₁ with no current energizing signal coil 37, curve C comprising an advanced saturation time T₂ as an aiding current is directed through signal coil 37, and curve D comprising a retarded saturation time T₃ as an opposing current is directed through signal coil 37. Thus, the firing point of the gas tubes may be advanced and the current delivered to the load increased with a small increase of saturating current to the reactor (curve C) and the firing point of the gas tubes may be delayed and the current delivered to the load decreased with a reversed polarity saturating current to the reactor (curve D).

It is to be noted, however, that the current through bias coil 38, operating in a manner similar to signal coil 37, may be initially adjusted to prevent self-saturation of reactors 24 and 30 by the source current passing through the main current coils 35 and 36 in which event the tube firing point may be advanced to full "on" or delayed to full "off" by merely varying the magnitude of saturating current through signal coil 37 without changing the polarity thereof.

It is to be additionally noted that although the circuit of Fig. 1 is illustrated and described as employing direct current signal energy through signal coil 37 for effecting earlier or later saturation of reactors 24 and 30 with the attendant time variation in firing point of the gas tubes, it is contemplated that phase shift of the tube firing point may be effected by an alternating current control signal energizing coil 37. This latter modification is simply made by reversing the circuit connections of either main winding 35 or 36, and additionally substituting an alternating current bias source (not shown) for the direct current bias source (21 of Fig. 1). Furthermore, any number of these circuits, just as the vacuum tube phase shifters and circuit network phase shifters they replace, may be employed in polyphase applications, i. e. two phase, three phase, etc. if desired.

Inasmuch as these variations and many others may be readily made by those skilled in the art in accordance with the basic invention, this invention is to be considered as limited only in accordance with the features thereof as set forth in the claims appended hereto.

What I claim as new and desire to secure by Letters Patent of the United States is:

1. In an excitation device for energizing a grid of a gas-filled tube to repetitively fire said tube at any preselected instant during like polarity half cycles of an alternating current source, a potential divider adapted to be energized by said source and including a unidirectional conducting device, a first impedance and a second impedance connected in series therewith, said first impedance having a constant value and said second impedance having two substantially constant values and being operable to switch from one value to the other upon the source current passing therethrough exceeding a given magnitude, adjustable means associated with said second impedance for determining the current magnitude necessary for switching the same, and means for energizing said grid with the voltage existing across said first impedance whereby the voltage appearing across said first impedance is abruptly varied from a lower to a higher value at a variable instant during like polarity half cycles of the source as determined by said signal means and said higher value voltage is conducted to fire said tube.

2. An excitation device for firing a gas filled electron tube having a conduction controlling grid comprising: a potential divider adapted to be energized by an alternating current source, said divider including a self-saturating reactor, a rectifier, and an impedance of constant value all being interconnected in series, said self-saturating reactor having a large impedance when unsaturated and a small impedance when saturated; and being operable to switch from one value to the other upon the current passing therethrough exceeding a given amplitude, a saturating control winding associated with said reactor for varying this required amplitude of switch current through a wide range in response to variations of control current passing therethrough, and means for energizing said conduction controlling grid with the voltage existing across said impedance of constant value whereby variation of said control current enables a wide variation in the tube firing point.

3. An excitation device for firing a gas filled electron tube having a conduction controlling grid comprising: a potential divider adapted to be energized by an alternating current source, said divider including a self-saturating reactor, a rectifier, and an impedance of constant value, said self-saturating reactor having a large impedance value when unsaturated and a small impedance value when saturated; and being operable to switch from one value to the other upon the current passing therethrough exceeding a given amplitude, a first saturating winding associated with said reactor for determining the amplitude of source current necessary for switching the same responsively to a control current passing therethrough, and a second saturating winding associated with said reactor for varying the amplitude of source current necessary for switching said reactor from the value determined by said first winding in response to a signal current passing therethrough, whereby connecting the conduction controlling grid of the gas tube across said impedance of constant value enables a wide variation in the tube firing point in response to small variations of signal current.

4. A pulse phase shifter comprising: a potential divider adapted to be energized by a recurrently varying current source, said divider including in circuit a unidirectional conducting device, a first impedance having a constant value, and a second impedance having two substantially constant values and being self-operable to switch from one value to the other in response to the source current passing therethrough exceeding a given amplitude, auxiliary electrical means associated with said second impedance for varying its response to current passing therethrough and enabling different current amplitudes to effect said switching function, a load, and means for connecting said load in parallel with said first impedance, whereby said switching function enables the generation of voltage pulses from across said first impedance, and said auxiliary electrical means determines the time phase occurrence of said pulses.

5. In a device for controlling power to a load, a potential divider adapted to be energized by a periodically varying current source, said divider including in series connection a rectifier, a first impedance having a substantially constant value, and a second impedance having two substantially constant values, one larger than the other; and being self-operable to switch from said larger value to the smaller value in response to the source current passing therethrough exceeding a given amplitude, a first auxiliary electrical means associated with said second impedance for varying its response to current passing therethrough and enabling different source amplitudes to effect said switching function, and a second auxiliary electrical means associated with said second impedance for independently varying its response to source current passing therethrough, whereby said switch of the second impedance to a lower value enables the generation of a discontinuous voltage pulse across the first impedance and said first and second auxiliary electrical means determine the time phase occurrence of said pulse relative to said periodically varying current source; a gaseous discharge tube having an anode, cathode, and conduction controlling grid, means for enabling the energization of said tube plate-cathode circuit by said alternating current source and means connecting said tube grid-cathode circuit across said first impedance.

6. In a time-phase shifting circuit for controlling the conduction time of two-push energized gas filled electron tubes having conduction controlling grids to thereby control the full wave direct current energy to a load, two potential divider circuits connected back-to-back and being energizable by a push-pull current source, each circuit including a first impedance and a second impedance connected in series, said first impedances having a constant value and said second impedances having two substantially constant values and being operable to switch from one value to the other upon the source current passing therethrough exceeding a given magnitude, a rectifying means in circuit with each said potential dividers, said rectifying means being arranged to enable unidirectional source current of one polarity to flow through one said divider and unidirectional source current of the opposite polarity to flow through said other divider, adjustable means associated with said second impedances for determining the current magnitude necessary for switching the same, and means for energizing each of the conduction controlling grids of the push-pull connected gas tubes in accordance with the potential across a different one of said first impedances.

7. A bidirectional pulse-phase shifter comprising: two potential divider circuits adapted to be energized by alternating current sources, 180° out of time phase, each circuit including a unidirectional conducting device, a first impedance and a second impedance in series therewith said first impedances having a constant value, and said second impedances having two substantially constant values and being operable to switch from one value to the other upon the source current passing therethrough exceeding a given magnitude, signal means associated with said second impedances for jointly varying their response to current passing therethrough and enabling different current magnitudes to perform said switching function, a time phase sensitive load connected in parallel with each of said first impedances, whereby the voltages appearing across said first impedance of each voltage divider is abruptly varied from a lower to a higher value at a variable instant during half cycles of the source as determined by said signal means and said time-phase sensitive loads are alternatively energized by said abruptly generated voltages.

8. A bidirectional pulse-phase shifter comprising: a potential divider adapted to be energized by a bidirectional varying current source, a second potential divider adapted to be energized by a bidirectional varying current source 180° out of time phase with said first source, each of said dividers including a resistor and a self-saturable reactor in series connection therewith, said reactors having a large impedance value when unsaturated and a small impedance value when saturated; and being self-switchable from one value to the other upon the source current passing therethrough exceeding a given amplitude, rectifying means in circuit with each reactor to enable unidirectional source current of one polarity to flow through the reactor of one said divider and unidirectional source current of the opposite polarity to flow through the reactor of said second divider, at least one control coil magnetically associated with both reactors and adapted to be energized by a control signal to vary the degree of saturation of both reactors, a time phase sensitive load connected in parallel with each resistor, whereby the self-saturation of the reactors in response to a given amplitude of source current enables the generation of unidirectional voltage pulses of opposite polarity across said resistors, and the amplitude and sense of applied signals to the control coil determines the time-phase occurrence of said pulses.

9. A multi-phase pulse phase shifter adapted to be energized by a multi-phase power source and generate a plurality of pulses, one for each complete cycle of each phase of said source, and wherein each said pulses may be variably time-phase shifted a like amount with respect thereto comprising: a plurality of potential divider circuits, each circuit connectible to the terminals of a different phase of said source, said dividers each including a unidirectional conducting device, a first impedance and a second impedance, said first impedances having a constant value, and said second impedances having two substantially constant values and being operable to switch from one value to the other upon the source current passing therethrough exceeding a given magnitude, signal means associated with all said second impedances for jointly varying their response to current passing therethrough and enabling different current amplitudes to perform said switching function, whereby the voltage appearing across said first impedance of each divider is abruptly varied from a lower to a higher value at a variable instant during each cycle of its energizing source as determined by said signal means.

10. A device for controlling the direct current power to a load from a multi-phase power source comprising: a plurality of potential divider circuits, each circuit connectible to the terminals of a different phase of said source, said dividers each including a unidirectional conducting device, a first impedance and a second impedance, said first impedances having a constant value, and said second impedances having two substantially constant values and being operable to switch from one value to the other upon the source current passing therethrough exceeding a given magnitude, signal means associated with all said second impedances for jointly varying their response to current passing therethrough and enabling different current amplitudes to perform said switching function, whereby the voltage appearing across said first impedance of each divider is abruptly varied from a lower to a higher value at a variable instant during half cycles of its energizing source as determined by said signal means; a plurality of gaseous discharge tubes, each having an anode, cathode, and control electrode, the anode-cathode circuit of each tube being connectible across a different phase of said multi-phase source in series with said load, and means connecting the control electrode-cathode circuit of each tube in parallel with the first impedance of the divider which is associated with the same phase of the multi-phase source.

11. A multi-phase pulse phase shifter adapted to be energized by a multi-phase power source and generate a plurality of pulses, one for each complete cycle of each phase of said source, and wherein each said pulses may be variably time phase shifted a like amount with respect thereto comprising: a plurality of potential divider circuits, each having one terminal thereof connected to a common point and another terminal connectible to a different output of said multi-phase source, said dividers each including a unidirectional conducting device, a first impedance, and a second impedance, said first impedances having a constant value, and said second impedances having two substantially constant values and being operable to switch from one value to the other upon the source current passing therethrough exceeding a given magnitude, signal means associated with said second impedances for jointly varying their response to current passing therethrough and enabling different current amplitudes to perform said switching function, whereby the voltage appearing across said first impedance of each divider is abruptly varied from a lower to a higher value at a variable instant during cycles of its energizing source as determined by said signal means.

12. A multi-phase pulse phase shifter adapted to be energized by a multi-phase power source and generate a plurality of pulses, one for each complete cycle of each phase of said source, and wherein each of said pulses may be variably time phase shifted a like amount with respect thereto comprising: a plurality of potential divider circuits, each having one terminal thereof connected to a common point and another terminal connectible to a different output of said multi-phase source, each of said dividers including a resistor and a self-saturable reactor in series connection therewith, said reactors having a large impedance value when unsaturated and a small impedance value when saturated, and being self-switchable from one value to the other upon the source current passing therethrough exceeding a given amplitude, rectifying means in circuit with each reactor to enable only a unidirectional source current to pass therethrough, at least one control coil magnetically associated with all said reactors and adapted to be energized by a control signal to vary the degree of saturation of all reactors, whereby the self-saturation of these reactors in response to a given amplitude of source current enables the generation of multi-phase voltage pulses across the plurality of resistors, each of which is phase shifted a like amount with respect to the related phase of the multi-phase power source, and jointly time phase shiftable with respect to the individual phases of said source in response to the amplitude and polarity of signals applied to the control coil.

References Cited in the file of this patent

UNITED STATES PATENTS

| | | |
|---|---|---|
| 2,459,551 | Steinitz | Jan. 18, 1949 |
| 2,463,463 | Izenour | Mar. 1, 1949 |